May 5, 1931. J. WAHL 1,803,373

TIRE VALVE CAP OR THE LIKE

Filed Oct. 12, 1926

INVENTOR:
John Wahl,
By Attorneys,

Patented May 5, 1931

1,803,373

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

TIRE VALVE CAP OR THE LIKE

Application filed October 12, 1926. Serial No. 141,059.

This invention relates to valve caps or the like, and aims to provide certain improvements therein.

In the standard form of valve caps now in use the cap is provided with a dome-shaped rubber washer which is carried within the recess in the cap, the lower face of the washer being adapted to make contact with the nipple of the tire valve and the upper face of the washer being usually provided with a dome-shaped anti-friction disk which fits against a spherical recess formed on the interior of the cap. The dome-shaped washer has been usually provided with a lateral extension which fits in a circular groove formed on the interior of the cap.

This construction permits a certain amount of tilting of the washer so that it will assume a true seating position by accommodating itself to slight irregularities in the cap and tire nipple. Such caps and washers are manufactured in large quantities and it is difficult to maintain the accuracies in construction which are desired. For instance, in moulding the cap washer with its anti-friction disk (to which is usually added a stiffening disk) the anti-friction disk sometimes tilts in the mould with the result that a surplus of rubber will be formed on the upper side of the disk and an insufficient quantity on the lower side of the disk. This makes a washer which is lopsided and if the error is considerable, such a washer is found to produce a leaky cap. Furthermore, in manufacturing the cap bodies if the dies become slightly worn or are misadjusted, the interior recess holding the washer becomes so large that the washer will tilt in the cap body to an extent which prevents it from righting itself when the cap is screwed on the nipple.

Among the objects of the present invention is to avoid these difficulties and produce a washer which is substantially perfect in form and which can be successfully used with cap bodies having a considerable margin of error in their dimensions.

In the drawings which illustrate one form of the invention—

Figure 1:
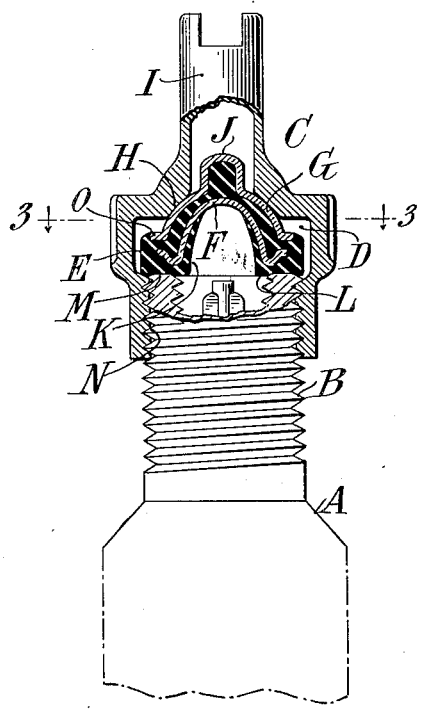
Figure 1 is a view of the cap as applied to a valve, showing the washer and part of the cap in section.

Referring to the drawing, let A indicate any suitable tire valve and B its screw-threaded nipple. C represents the cap in its preferred form having on its interior a circular groove D and a spherical bearing face H. K indicates the washer as a whole which is formed with a seating face L adapted to contact with the end M of the nipple. Preferably a dome-shaped stiffening member F is introduced into the washer to avoid collapse of the lower wall of the latter when the cap is screwed on the nipple. The extreme edge of the washer is indicated by the letter E which edge preferably is of such a diameter that the washer can be introduced into the cap only by forcing it past the screw-threads N, the portion E yielding during the introduction and restoring itself to normal after the washer is fully in place.

Ordinarily such washers are provided with an anti-friction disk G, the diameter of which is less than that of the rubber washer, the disk G being just small enough to pass the threads N in introducing the washer. The edge E of the washer hence projects beyond the edge O of the anti-friction disk G.

Figure 2:
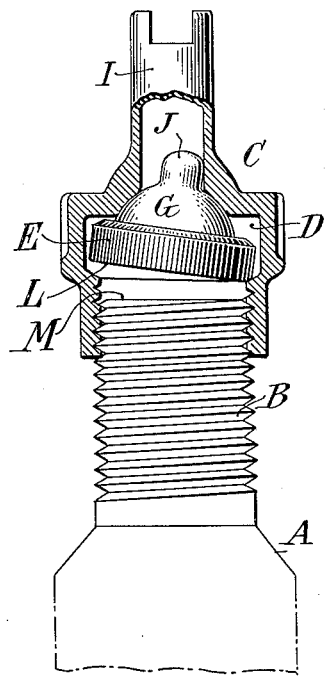
Fig. 2 is a similar section of the cap, the washer and valve being shown in elevation; this figure illustrating the capacity for limited tilting of the washer.
Figure 4:
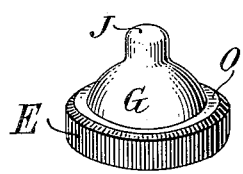
Fig. 4 is a perspective view of the preferred form of washer.
Figure 3:
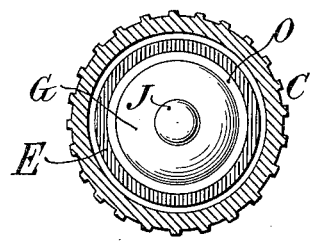
Fig. 3 is a section on the line 3—3 in Fig. 1.

In constructing the cap bodies, it is difficult to maintain the dies in such adjustment and condition as to invariably produce a circular groove D of precisely the same depth. Occasionally, therefore, this groove will be too deep, with the result that the washer will tilt within the cap to such an extent that it will not right itself when applied to a tire valve. One of the objects of the present invention is to so construct the washer that it is capable of efficient operation with a wide variation in the cap bodies. To this end I provide a means for limiting the tilting movement of the washer irrespective of the precise size of the circular recess D. Preferably this limiting means is located at the top of the washer, and preferably comprises a recess and a projection, one arranged on the cap and the other on the washer. Since the cap is already provided with a screw-driver I, the projection is best arranged on the washer, and this is most suitably accomplished by a nipple J formed in the middle of the upper side of the anti-friction disk G. This can be done at very little or no expense during the operation of stamping out the disk. The function of the nipple J is well illustrated in Figure 2, wherein the washer is shown in a position which represents the extreme tilting movement permitted by the construction when the projection J is over against one side of the recess of the screw-driver and further angular movement is thereby prevented. The degree of tilting movement permitted is the result of the proportions selected for the recess and projection, since the larger the projection with a given recess, the less the permissible tilting movement will be. The proportions illustrated in the drawings are found to work well in practice.

Figure 5:
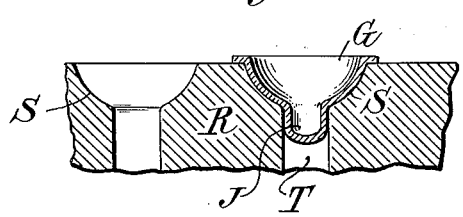
Fig. 5 is a detail showing the lower half of the mould used in vulcanizing.

Referring now to Figure 5, wherein I have illustrated a section of the mould used for vulcanizing such washers, it will be seen that the mould R is provided with a cup-shaped cavity S conforming to the upper side of the anti-friction disk G. In prior constructions for vulcanizing caps having spherical anti-friction disks such cavities were of the same shape and it has been found in practice that in quantity productions a certain percentage of such anti-friction disks either when inserted in the cavities or during the operation of vulcanizing would be tilted slightly in the cavities, the spherical form lending itself to such tilting movement, and a certain proportion of lopsided washers have resulted. By the use of the present invention the mould is formed with a narrow opening T into which the projection J fits, the result being that the disk G can assume only one position if fairly within the cavity, and this position is the correct one for the moulding operation. The disk G is held in this correct position during the subsequent operations and practically no imperfect washers are produced.

Hence by the present invention I am enabled to produce not only a construction in which the washer accommodates itself to various errors in the cap, but also a washer which in quantity production may be manufactured with an entirely negligible percentage of imperfect structure.

While I have shown and described one form of the invention, it will be understood that the latter is not necessarily limited to valve caps with imperforate washers but may be applied to other constructions which are intended to be covered by the word "cap" as used in the claims. It will also be understood that modifications may be made in the particular form illustrated.

What I claim is:

1. A cap comprising a body portion provided with an internal bearing face, a recess in the top of said bearing face, a packing washer in said cap having a face in slidable contact with the bearing face of the cap and tiltable with relation to the axis of the cap, a projection on the washer extending into the recess in the cap and of smaller diameter than the said recess adapted to limit the tilting of the washer by engagement with the wall of the recess.

2. A cap having a spherical bearing face, a packing washer having a similar face in contact with said bearing face and tiltable thereon with relation to the axis of the cap, and means for preventing undue tilting of said washer, said means located at the top of the washer.

3. A cap having an internal recess crowned with a spherical bearing face, a dome shaped packing washer in said recess, an anti-friction device at the top of said washer in contact with said bearing face and tiltable thereon with relation to the axis of said cap, and cooperating means on the anti-friction device and the cap, at the crown portion of the recess for preventing undue tilting of the washer.

4. A cap having a recess of different diameters, a spherical bearing face connecting the portions of said recess of largest and smallest diameters, a dome-shaped washer within said portion of the recess of largest diameter, an anti-friction device having a spherical face engaging the spherical face of the cap and tiltable thereon to tilt the washer with relation to the axis of the cap, and a projection on said anti-friction device extending into the recess of smallest diameter and adapted by contact with the wall of said recess to limit the tilting motion.

5. A cap having an internal recess, and a washer within said recess adapted to tilt therein while still engaging the cap, and means for limiting such tilting movement, said means being located at the top of the washer, and comprising a projection on one part and a recess on the other.

6. A cap having an internal recess and a washer, adapted to tilt within the cap while still engaging the cap, an anti-friction member between the washer and cap, said antifriction member comprising a dome-shaped sheet metal member having a nipple or projection struck up from the top thereof, and said cap having a second recess into which said nipple enters, the proportions of the nipple and the second recess being such that tilting movement of the washer is permitted to a certain extent by movement of the nipple in the recess and is prevented when the nipple engages the wall of the recess.

In witnesss whereof, I have hereunto signed my name.

JOHN WAHL.